(12) United States Patent
Kraft

(10) Patent No.: US 8,189,313 B1
(45) Date of Patent: May 29, 2012

(54) FAULT DETECTION AND HANDLING FOR CURRENT SOURCES

(75) Inventor: Jonathan P Kraft, Frederick, CO (US)

(73) Assignee: Analog Devices, Inc., Norwood, MA (US)

( * ) Notice: Subject to any disclaimer, the term of this patent is extended or adjusted under 35 U.S.C. 154(b) by 681 days.

(21) Appl. No.: 12/327,429

(22) Filed: Dec. 3, 2008

(51) Int. Cl.
*H02H 3/08* (2006.01)
*H02H 9/02* (2006.01)

(52) U.S. Cl. ..................................... 361/93.1

(58) Field of Classification Search .................. 361/93.1, 361/93.2; 315/121, 123
See application file for complete search history.

(56) References Cited

U.S. PATENT DOCUMENTS 7,294,971 B2 * 11/2007 Jin ................................ 315/177
2010/0045194 A1 * 2/2010 Peker et al. ............... 315/185 R

OTHER PUBLICATIONS

Analog Devices, Inc., Charge Pump Driver for LCD White LED Backlights ADM8845, Rev. A, 2005, pp. 1-20, Analog Devices, Inc., Norwood, Massachusetts.
Analog Devices, Inc., Four White LED Backlight Driver ADM8843, Rev. A, 2006, pp. 1-16, Analog Devices, Inc., Norwood, Massachusetts.
On Semiconductor, NCP5608 Multiple LED Charge Pump Driver, Jun. 2006, Rev. 1, pp. 1-16, Semiconductor Components Industries, LLC.
Texas Instruments, Dual Output Boost WLED Driver Using Single Inductor TPS61150A, Oct. 2006, pp. 1-23, Texas Instruments Incorporated.
National Semiconductor, LP5520 RGB Backlight LED Driver, May 2007, pp. 1-34, National Semiconductor Corporation.
On Semiconductor, NUD4301 Dual Channel LED Driver/Current Source, May 2007, pp. 1-7, Semiconductor Components Industries, LLC.
On Semiconductor, AN8294/D, Medium Size Backlight NCP5050: Drive Up to 120 LEDs (6 to 10 in Series Configuration), Jun. 2007, pp. 1-13, Semiconductor Components Industries, LLC.
Hill, Sherry; News Article Catalyst Launches Alternative to Industry-Standard '604 LED Driver with Improved Average Efficiency, Dec. 14, 2007, pp. 1-2, Catalyst Semiconductor, Inc.
On Semiconductor, CAT3604V, 4-Channel Quad-Mode LED Driver with Open/Short LED Detection, 2008, pp. 1-15, Semiconductor Components Industries, LLC.
Maxim Integrated Products, 8-String White LED Driver with SMBus for LCD Panel Applications, MAX17061, Jan. 2008, pp. 1-26, Maxim Integrated Products, Inc.
Lam, Crystal; Driving LED Lighting in Mobile Phones and PDAs, Jun. 12, 2008, pp. 1-8, MobileHandsetDesignLine.com.
Arnold, Bob; Barnett, Joe; Novitsky, Tom; Endicott Research Group, Inc.; The Drive Toward LED-based LCD Backlighting, May 1, 2007, pp. 1-4, ecnmag.com.

* cited by examiner

*Primary Examiner* — Rexford N Barnie
*Assistant Examiner* — Christopher Clark
(74) *Attorney, Agent, or Firm* — Marger Johnson & McCollom PC

(57) ABSTRACT

A current source driving an LED is monitored for a fault condition such as an open circuit or a short circuit. The current source may be disabled and/or a common power source may be disabled in response to the type of fault condition. A test current may be applied to the current source to determine the type of fault.

20 Claims, 5 Drawing Sheets

FAULT DETECTION AND HANDLING FOR CURRENT SOURCES

BACKGROUND

Light emitting diodes (LEDs) are replacing other light sources in applications such as handheld flashlights, backlights for LCD displays, camera flash units, etc., due to efficiency, reliability, cost, and other factors. LEDs, however, have specific drive requirements that must be observed for proper operation. For example, the amount of light emitted by an LED is determined primarily by the amount of drive current applied to the device. Human vision is highly sensitive to light fluctuations caused by small variations in the drive current, and therefore, accurate currents sources must be used to drive LEDs. With relatively large display panels, multiple LEDs or strings of LEDs must be used to backlight the entire display. Thus, not only must the current sources have a high level of absolute accuracy, but they must also be well-matched relative to each other to prevent some regions of the display from appearing brighter than other regions.

The development of white LEDs has contributed to the increasing popularity of LED light sources, but has also increased the demands on the circuitry used to drive these devices. For example, the operating voltage for a white LED may be several times greater than the operating voltage of a red LED. Therefore, a boost converter may be required to boost the voltage of a battery in a portable device to an adequate level for operating a white LED. Thus, drive circuitry for LED lights sources has become increasingly complex and created more opportunities for harmful fault conditions. Even in applications where a boosted power supply is not required, fault conditions have become more problematic.

DETAILED DESCRIPTION

Figure 1:
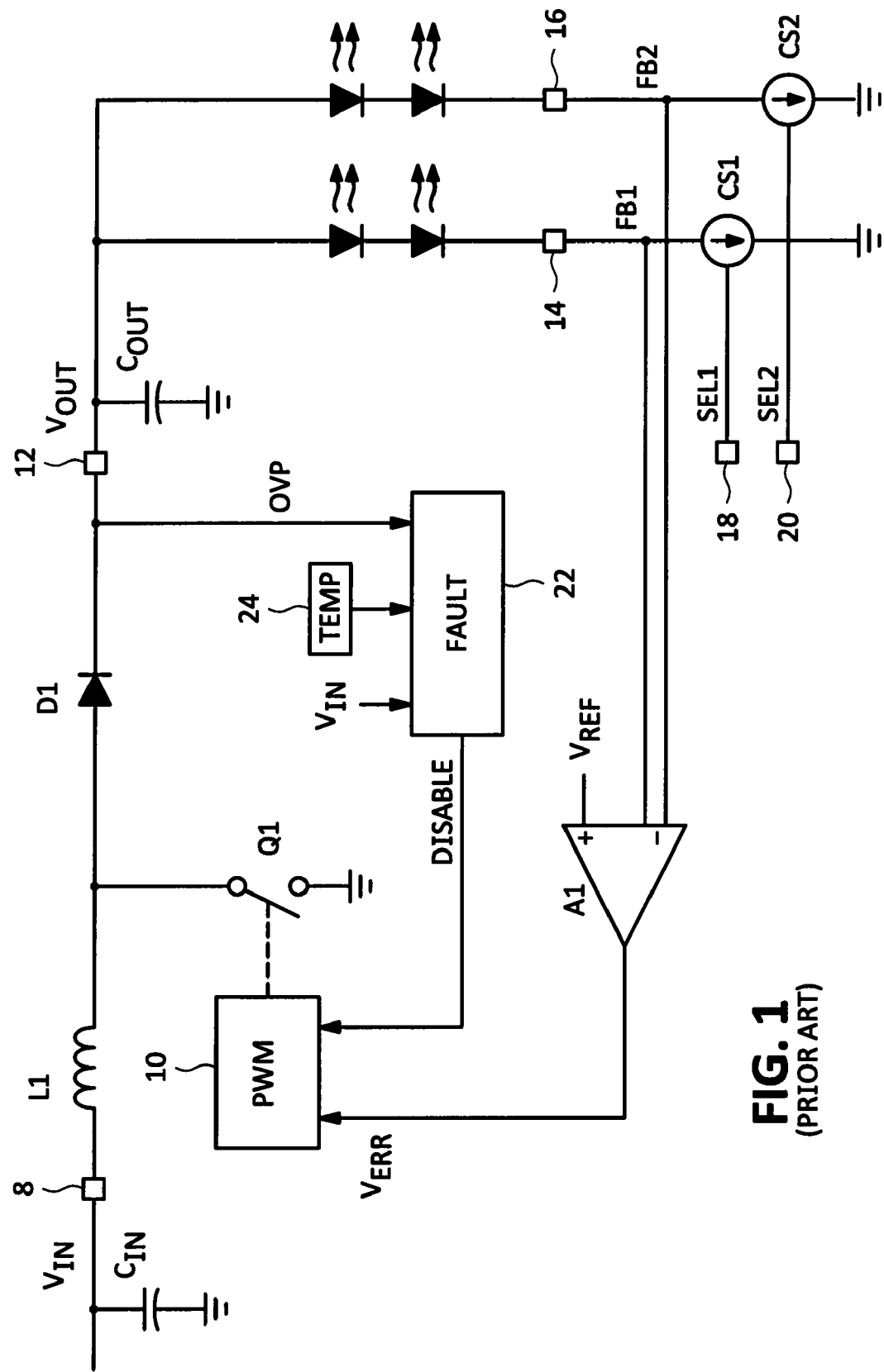
FIG. 1 illustrates a prior art driver for two strings of LEDs.

FIG. 1 illustrates a prior art driver for two strings of LEDs. In this example, the driver includes an inductive type DC-DC boost converter to boost a nominal 5 volt batter power supply to a value upwards of 20 volts to enable up to four white LEDs to be connected in series in each string. Other systems may employ switched capacitor boost circuits, especially in lower voltage systems in which each string only includes a single LED. The input voltage $V_{IN}$ is applied to the input capacitor $C_{IN}$ and one end of inductor L1. A switching power supply controller 10 drives switch Q1, which is typically a MOS transistor, with a pulse width modulation (PWM) control signal. The switching action of Q1 causes the other end of inductor L1 to generate high voltage pulses that are rectified by diode D1 and smoothed by output capacitor $C_{OUT}$. The boosted output voltage $V_{OUT}$ appears at the output terminal 12 to provide power to both strings of LEDs. The driver of FIG. 1 is generally implemented on a single integrated circuit with various larger components such as L and $C_{OUT}$ located off-chip.

Each LED string is connected to a respective current source CS1 or CS2 through one of terminals 14 or 16 to accurately regulate the current through each string. The value of the drive current in each current source is generally determined by external current-setting resistors or an internal digital to analog converter (DAC). Each current source can be independently enabled by one of the select signals SEL1 or SEL2.

Since the boost circuit is less efficient at higher output voltages, a voltage feedback loop is included to enable the driver to operate at the lowest possible boost voltage while still providing adequate headroom for the current sources CS1 and CS2 to operate properly. For example, each of the current sources may require a minimum of several hundred millivolts across the current source to provide adequate current regulation. Error amplifier A1 samples the voltage across both current sources at nodes FB1 and FB2 and generates an error signal $V_{ERR}$ that causes the PWM controller to regulate $V_{OUT}$ to the minimum value required to maintain the voltage of the lowest of FB1 and FB2 at the value $V_{REF}$. For example, if $V_{REF}$ is set to 0.7 volts, FB2 is operating at 1.0 volts, and FB1 dips to 0.6 volts, the voltage feedback loop increases the boost voltage $V_{OUT}$ until FB1 increases to 0.7 volts.

The system of FIG. 1 also includes a fault protection circuit 22 to respond to various fault conditions. If the input voltage $V_{IN}$ falls below an undervoltage threshold, the fault protection circuit disables the boost converter until $V_{IN}$ rises above the threshold. An input from a temperature detector 24 also causes the fault protection circuit to disable the system whenever the temperature of the integrated circuit rises above a safe operating limit.

Additionally, the fault protection circuit provides overvoltage protection at the boost output by disabling the system when $V_{OUT}$ rises above an overvoltage threshold. This feature prevents excessive output voltage from developing at $V_{OUT}$ in response to an open circuit fault on one of the current sources. For example, if the first string of LEDs is disconnected from the FB1 terminal, the voltage at FB1 drops due to the pull-down effect of CS1. The error amplifier in the voltage feedback loop attempts to compensate by increasing the boost voltage $V_{OUT}$ which, in turn, may result in excessive power dissipation in the other LED string and/or the current source CS2. If this fault condition persists, then the boost converter or the faulty current source must be disabled.

Although the system of FIG. 1 provides protection against the fault conditions described above, it does so in a manner that results in a complete loss of all lighting functionality. For example, if the two LED strings are used to backlight a single large display, the disconnection of one LED string results in a loss of backlighting for the entire display rather than just one portion. Likewise, in a clamshell handset, if the first and second LED strings are used to backlight the main display and the sub display, respectively, then the disconnection of one LED string results in a loss of backlighting for both displays.

One solution is to independently monitor the voltages at FB1 and FB2 and disable the corresponding current source if the voltage at either of the feedback nodes drops below a predetermined threshold. The error amplifier is arranged to ignore the feedback voltage from the node corresponding to the disabled current source when regulating the boost voltage. Thus, even if there is an open circuit fault on one of the current sources, the boost power supply continues to operate and supply current to the LED string that is still connected to its corresponding current source.

This presents an additional problem, however, because a low voltage across the current source may be caused by faults other than an open circuit on the current source. For example, a short circuit to ground at the feedback node also causes a low voltage reading across the current source. In this type of short circuit fault condition, disabling the current source is inadequate, and continuing to operate the boost power supply could result in damage to the power supply and/or the supposedly disabled LED string because an unregulated and potentially excessive amount of current may flow through the LED string to ground through the short circuit. Moreover, from the information available to the circuit, both options (disabling the power source or disabling the current source) could create additional problems.

Figure 2:
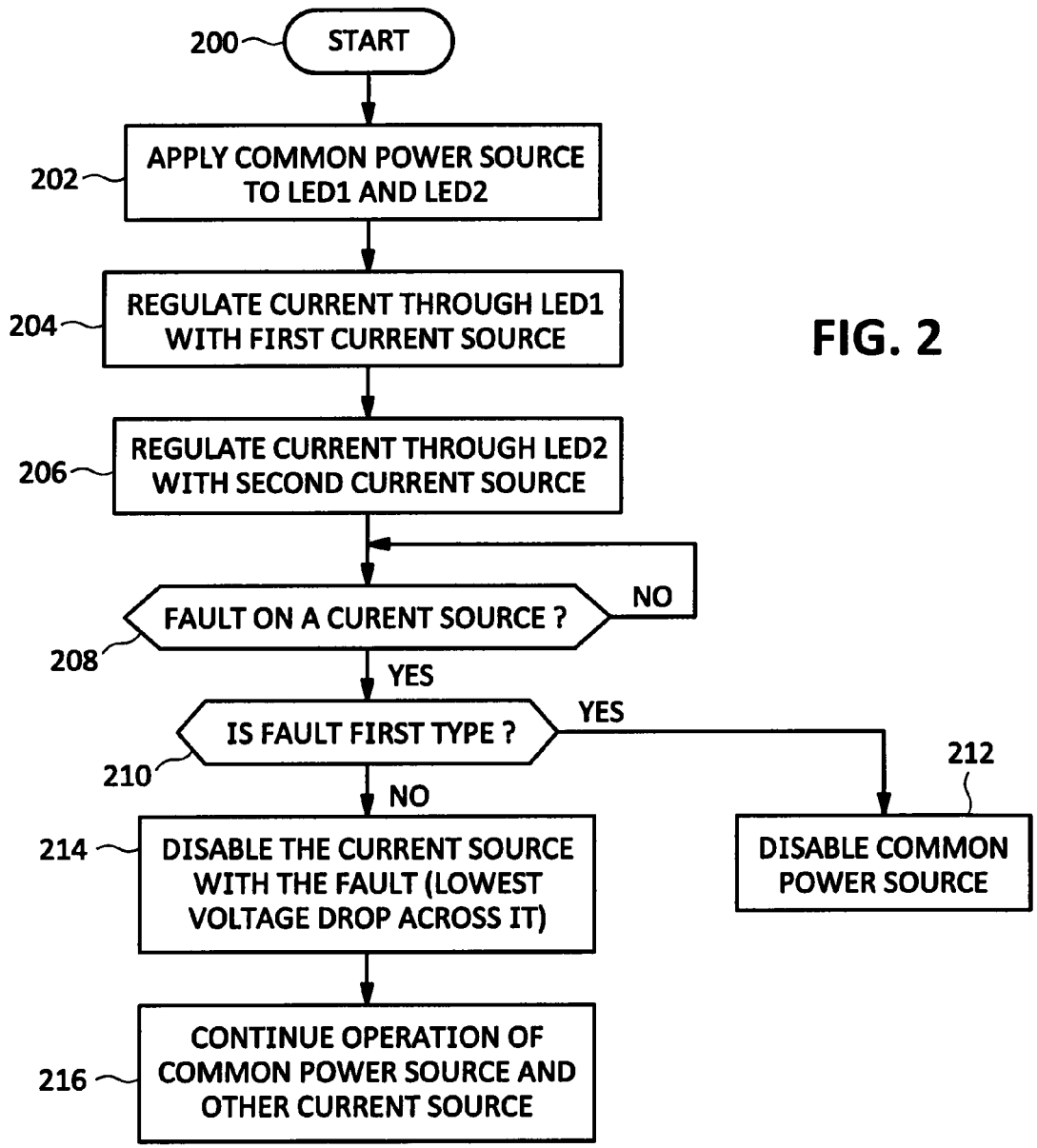
FIG. 2 illustrates an embodiment of a method for taking corrective action in response to the type of fault on a current source according to some of the inventive principles of this patent disclosure.

Some of the inventive principles of this patent disclosure relate to determining the type of fault condition on a current source and taking corrective action in response to the type of fault. In the example method illustrated in FIG. 2, an LED driver uses a common power source to provide current to first and second strings of LEDs (202). As used herein, the term string may include a single LED or multiple LEDs. The current through the first string is regulated with a first current source (204), and current through the second string is regulated with a second current source (206). At least one of the current sources is monitored for a fault condition (208). If a fault is detected, the type of fault is determined (210). If the fault is determined to be a first type of fault such as a short circuit, the common power source is disabled (212). If the fault is determined to a second type such as an open circuit, then the faulty current source (the current source with the lowest voltage across it) is disabled (214), but the common power source is allowed to continue providing current to the second string of LEDs (216).

Figure 3:
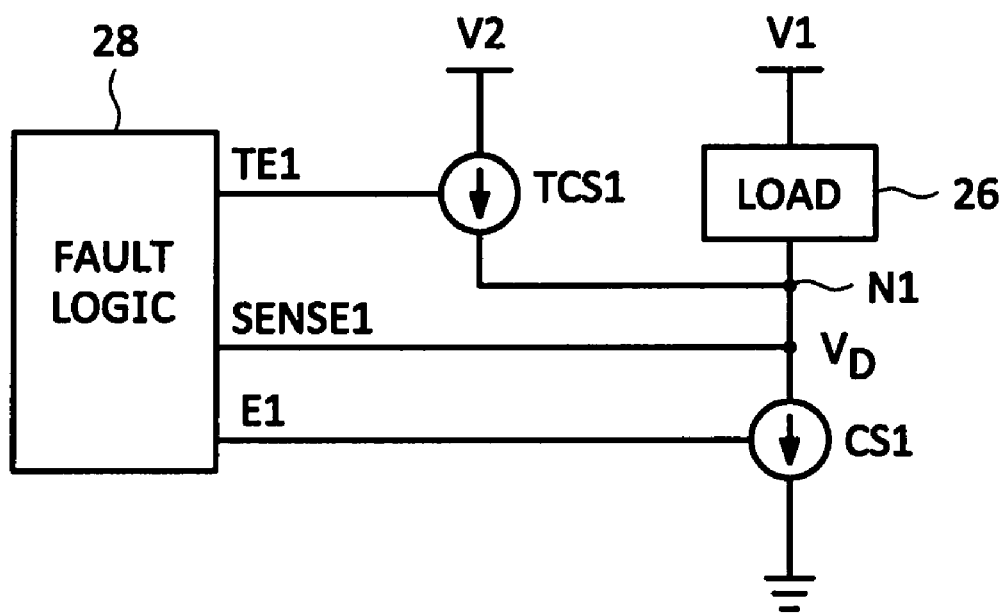
FIG. 3 illustrates an embodiment of a circuit for distinguishing between different fault conditions on a current source according to the inventive principles of this patent disclosure.

Some additional inventive principles of this patent disclosure relate to techniques for distinguishing between different types of fault conditions on a current source. FIG. 3 illustrates an example embodiment of a circuit for distinguishing between different fault conditions on a current source according to the inventive principles of this patent disclosure. The embodiment of FIG. 3 includes a current source CS1 arranged to drive an electrical load 26 which is connected to CS1 at node N1. The voltage $V_D$ at node N1 is monitored by fault logic 28 which controls CS1 through the enable signal E1. A test current source TCS1 is arranged to apply a test current to node N1 in response to another enable signal TE1 from the fault logic 28.

In operation, the fault logic monitors the current source for an indication of a fault condition. In this embodiment, a fault condition is indicated by the voltage $V_D$ dropping below a first threshold, but other indicators may be used. Once a fault is detected, the fault logic disables CS1 and enables TCS1 to apply a test current to CS1 at node N1.

If the fault is an open circuit type of fault, e.g., the load is disconnected from node N1, the test current causes the voltage $V_D$ to rise because CS1 is disabled and the test current has no path to ground. If $V_D$ rises above a second threshold level, the fault logic determines that the fault is the open circuit type.

If, however, the fault is the short circuit type, e.g., node N1 is shorted to ground, the voltage at node N1 remains below the second threshold level, and the fault logic determines that the fault is the short circuit type.

The fault logic may include additional functionality to take various actions based on the fault-type determination. For example, the embodiment of FIG. 3 may be included in an LED driver having two separately controlled strings of LEDs operated from a common power source. In such an arrangement, the load may be implemented as one of the strings of LEDs. The fault logic may include functionality to disable the common power source if the fault is determined to be a short circuit. Alternatively, if the fault is determined to be an open circuit, the fault logic may disable the current source CS1 and leave the common power source enabled to power the other string.

The embodiment of FIG. 3 is not limited to any particular implementation details. For example, the power source V1 that provides current to the load may be the same as, or different from the power source V2 that provides the test current through TCS1. The test current source TCS1 may be any suitable source such as a resistor that is controlled by a switch in response to a binary signal TE1, a transistorized current source controlled by TE1 as an analog bias signal, etc. The fault logic may implement any suitable delay between the time the test current source TCS1 is enabled and the time the voltage is measured at node N1 to enable $V_D$ to stabilize or reach a suitable measurement point. The enable signals E1 and TE1 may be independently controlled, or one may simply be generated as the logic complement of the other through an inverter. The fault logic may be implemented in any combination of analog or digital hardware, software, firmware, etc.

The embodiment of FIG. 3 is intended to provide a flexible solution that can be adapted to a wide range of applications. For example, in the context of an LED driver, all or most of the components, including the load which may be a string of LEDs, may be fabricated on an integrated circuit. Alternatively, the LED string may be separate from the remaining components, but mounted on the same circuit board as the integrated circuit, for example, in a wireless phone where the LED string provides backlighting for a display. In this environment, a functional open circuit may be caused by cold solder joints that have a relatively high, but finite resistance. Some other sources of functional open circuits include broken traces or solder connections due to flexing of the board, vibration or impact. Still other sources of functional open circuits include individual LEDs or strings of LEDs that have relatively high resistance due to manufacturing defects, or LEDs that have burned out due to over current or ESD events but have enough semiconducting material to provide a current path having relatively high resistance. Thus, for purposes of determining the type of fault according to the inventive principles of this patent disclosure, an open circuit includes a functional open circuit where a load having a sufficiently high abnormal resistance is connected to, or present in, the current source. The threshold levels for detecting a fault condition and determining the type of fault condition may therefore be set to any appropriate level.

Likewise, a functional short circuit may be caused by a solder bridge on the circuit board, a defect in the manufacture of the current source, or a current source that has been damaged in a manner that causes it to behave as short circuit. Thus, a short circuit includes any sufficiently low abnormal resistance connected to, or present in, the current source, and the threshold levels for detecting a fault condition and determining the type of fault condition may therefore be set accordingly.

Moreover, although the faults discussed above have generally been characterized as either short circuit or open circuit faults, the inventive principles extend to any other type of fault on the current source that may be responded to in the manners described herein and/or detected through the use of a test current as described herein.

Figure 4:
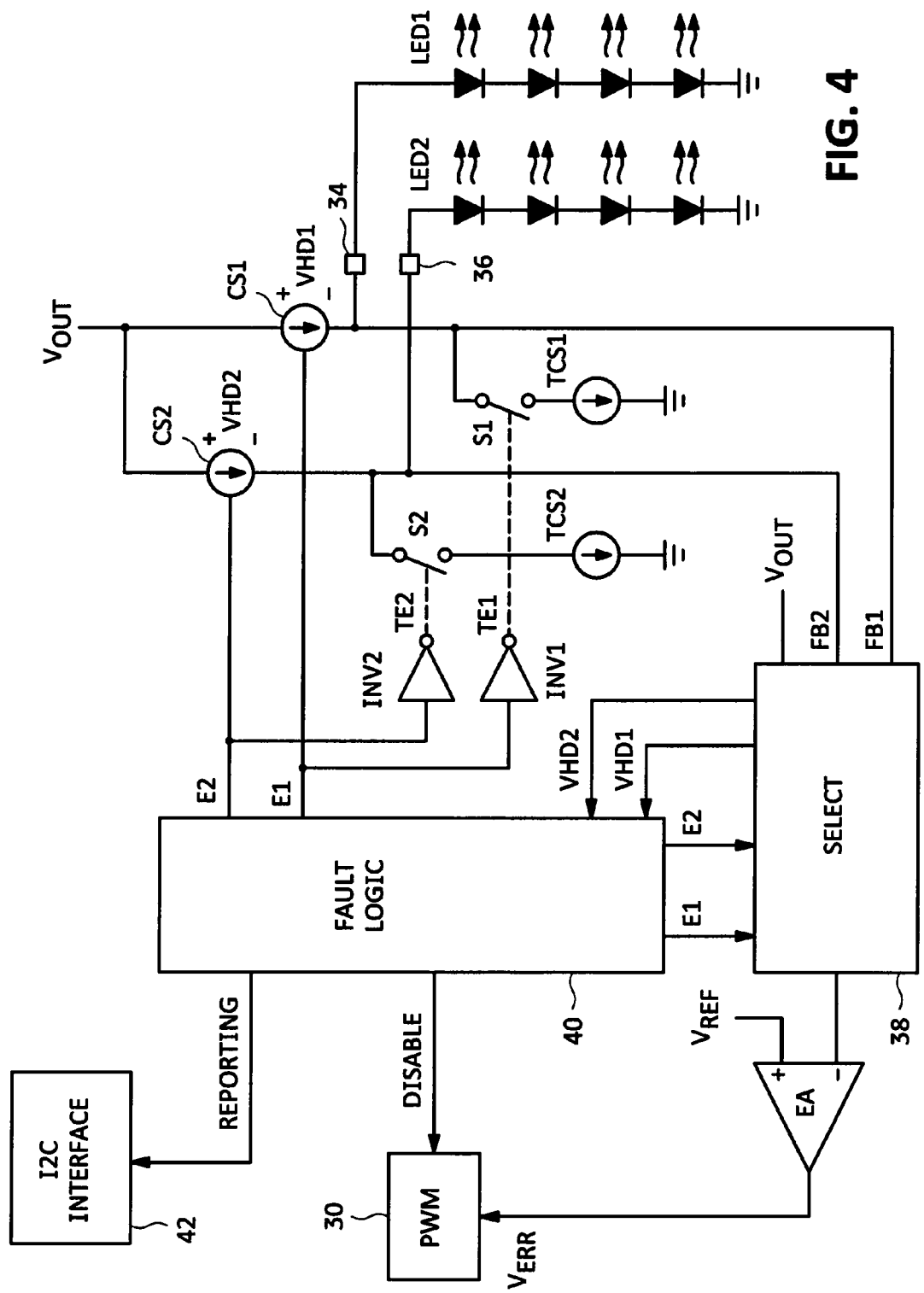
FIG. 4 illustrates an embodiment of an LED driver according to the inventive principles of this patent disclosure.

FIG. 4 illustrates an embodiment of a system for driving LEDs according to the inventive principles of this patent disclosure. The embodiment of FIG. 4 operates from $V_{OUT}$ which may be provided by any suitable power source. In this example, VOUT is assumed to be provided by an inductive type boost converter controlled by PWM controller 30. However, any other type of DC power source could be used to provide $V_{OUT}$. In this embodiment, the current sources CS1 and CS2 are arranged on the high side of the LED strings, but the inventive principles apply equally to embodiments in which the current sources are arranged on the low side of the strings. The LED strings are connected to their respective current sources at terminals 34 and 36. Other embodiments may include additional strings LEDx and current sources CSx arranged in a similar manner.

A select circuit 38 includes circuitry to measure the differential voltage VHD1 across CS1 by subtracting FB1 from $V_{OUT}$, and to measure the differential voltage VHD2 across CS2 by subtracting FB2 from $V_{OUT}$. Both of the differential voltages VHD1 and VHD2 are supplied to fault logic 40 for fault detection purposes as described below. During normal operation when both strings of LEDs are enabled, the lowest of VHD1 and VHD2 is selected and applied to the error amplifier EA to enable the voltage feedback loop to regulate the boosted output voltage $V_{OUT}$ to the lowest value needed to maintain a minimum voltage of $V_{REF}$ (which may be, for example, 500 mV) across both current sources CS1 and CS2. When operating in an open circuit fault mode as explained below, one of CS1 or CS2 is disabled, and therefore, the VHDx voltage from the other current source is always selected as the feedback voltage to the error amplifier. In other embodiments with more LED strings, the select circuit 38 may still need to select the lowest from among the VHDx voltages corresponding to any current sources that are not disabled during open circuit fault operation.

Fault logic 40 includes functionality to monitor the current sources CS1 and CS2 for a fault condition, determine the type of fault, and disable either the individual current source or the common power source $V_{OUT}$ in response to the type of fault. During normal operation, both enable signals E1 and E2 are active, so both current sources CS1 and CS2 are enabled. Both test current sources TCS1 and TCS2 are therefore disabled due to the inverting operation of inverters INV1 and INV2 which control switches S1 and S2. Also during normal operation, the fault logic 40 monitors the voltages VHD1 and VHD2 across CS1 and CS2. If either drops below a predetermined threshold, for example 200 mV, the fault logic first assumes the corresponding diode string is open and disables the current source by deactivating the enable signal Ex. This activates the corresponding test enable signal TEx which enables the test current source TCSx to apply a small test current, for example 10 µA, to the suspect current source.

If the voltage across the current source having a fault condition rises to another predetermined threshold, for example 400 mV, within a predetermined time period, for example 10 µs, the fault is confirmed to be the open circuit type, and the fault logic causes the system to continue to operate with the one current source disabled and the common power source operating normally so the other diode string continues to operate. The enable signals Ex are also applied to the select circuit 38 so that the select circuit knows to exclude the voltage VHDx of the disabled current source from the group from which the minimum is selected.

If, however, the voltage across the suspect current source fails to reach the second predetermined threshold, the fault logic disables the common power source $V_{OUT}$ to prevent potential damage that may be caused by the short circuit.

The inventive principles described above may provide efficient solutions for identifying and responding to different fault conditions while enabling the LED driver to maintain the functionality of unaffected LED strings even while operating with a fault condition on one or more other strings. For example, some embodiments may make efficient use of existing voltage monitoring circuitry, yet provide vastly more functionality with minimal additional logic and circuitry to provide test currents to the current sources.

The fault logic may also include functionality to report information about a fault such as the channel having the fault, the type of fault, the corrective actions that have been taken, etc., to an external system through an I2C interface 42 or other suitable communication link. The fault logic may further include functionality to disable the system in response to other fault conditions such as input undervoltage, output overvoltage, over temperature, inductor over current (by measuring the voltage across Q1 during the on state), etc.

The fault logic 40 may be implemented with any combination of analog or digital hardware, software, firmware, etc. Although the differential voltage measurement circuitry is included in the select circuit 38 in the embodiment of FIG. 4, it could alternatively be a separate circuit, or it could be included in the fault logic 40 or any other suitable circuit. In some embodiments, the voltage signal may be single-ended, for example, in embodiments in which the current sources are located on the low side of the LED strings and referenced to ground.

If a switched capacitor power source having multiple gain settings is used to provide $V_{OUT}$, it may be beneficial to re-execute the automatic gain selection process after disconnecting a current source due to an open circuit.

Figure 5:
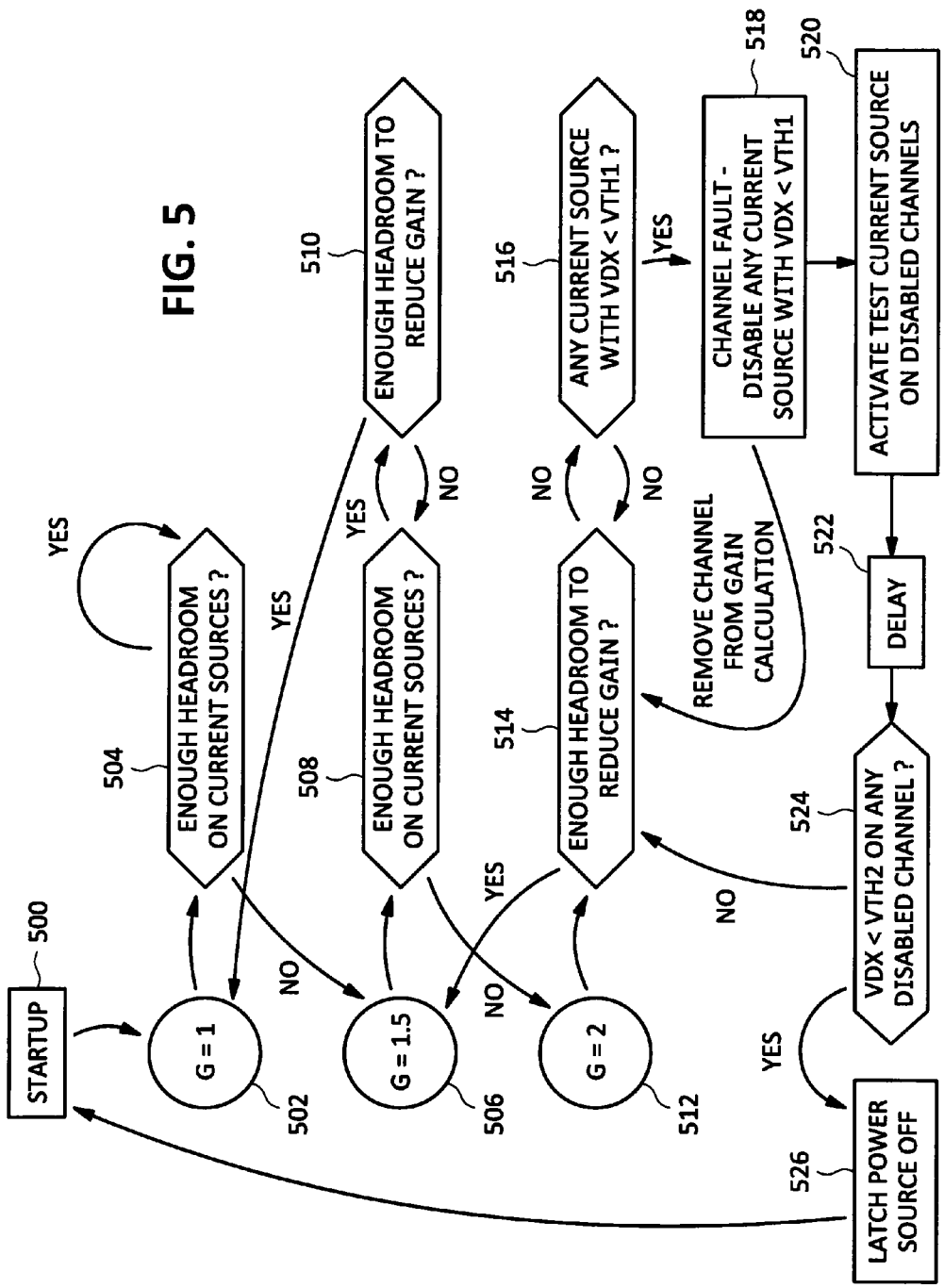
FIG. 5 illustrates a state machine for an embodiment of an LED drive method according to the inventive principles of this patent disclosure.

FIG. 5 illustrates a simplified state machine for an LED driver having multiple current sources and a common power source based on a switched capacitor power supply with three different gains according to some of the inventive principles of this patent disclosure. After a startup procedure (500), the system begins in the lowest gain state (502). If there is enough headroom across the current sources (504), the system remains in a loop at the lowest gain setting. If the headroom is inadequate, however, the system changes to then next highest gain setting (506) and again determines if there is enough headroom across the current sources (508).

If the headroom is adequate, the system enters a loop between states (508 and 510) in which the voltage headroom across the current sources is continuously check to determine if the headroom is too high or too low. If there is ever enough headroom to reduce the gain (510), the system transitions to the next lower gain state (502). If, however, the headroom ever becomes too low, the system transitions to the highest gain state (512).

Once at the highest gain state, the system enters a loop where it continuously checks for an opportunity to drop down to the next lower gain state (514) and looks for potential fault states on the current source (516). If the voltage VDx across any current source drops below a first threshold voltage VTH1, it indicates a fault condition. Any channel with a fault condition is disabled (518) and removed from the next gain calculation (514). The test current sources for all disabled channels are enabled (520), and after a predetermined time delay (522), the system determines whether the voltage VDx across any disabled channel is below a second threshold VTH2 (524), which may typically be lower than the first threshold. If voltage across the current source on any disabled channel is below the second threshold, it indicates a short circuit fault, and the entire power supply is latched off (526).

The power supply remains off unless the startup procedure is entered again, for example, through a system reset or power-up.

The inventive principles of this patent disclosure have been described above with reference to some specific example embodiments, but these embodiments can be modified in arrangement and detail without departing from the inventive concepts. For example, some of the embodiments described above have been shown with two strings of diodes, but the inventive principles apply to a driver for any number of strings. As another example, some of the embodiments described above have been described with LEDs as loads, but the inventive principles apply to other types of optoelectronic light sources. Thus the term LED, as used herein, also refers to any type of current driven optoelectronic load having similar drive requirements. As yet another example, some embodiments have been described in the context of systems having boosted power supplies, but the inventive principles apply to systems having any suitable power source, e.g., systems in which the power is supplied directly from a battery. Moreover, in some alternative embodiments, the current through a current source may be measured through an independent sensor that is not part of the current source.

Since the embodiments described above can be modified in arrangement and detail without departing from the inventive concepts, such changes and modifications are considered to fall within the scope of the following claims.

The invention claimed is:

1. A method comprising:
   providing current to first and second strings of LEDs with a common power source;
   regulating the current through the first string of LEDs with a first current source;
   regulating the current through the second string of LEDs with a second current source;
   monitoring the first current source for a fault condition;
   determining the type of fault condition;
   disabling the common power source if the fault condition is a first type; and
   disabling the first current source and continuing to provide current to the second string of LEDs if the fault condition is a second type.

2. The method of claim 1 where the first type of fault is a short circuit fault and the second type of fault is an open circuit fault.

3. The method of claim 1 where determining the type of fault condition comprises:
   disabling the first current source; and
   applying a test current to the first current source.

4. The method of claim 3 where determining the type of fault condition further comprises determining if a voltage on the first current source reaches a threshold while the test current is applied to the first current source.

5. The method of claim 1 further comprising:
   monitoring the second current source for a fault condition;
   determining the type of fault condition on the second current source;
   disabling the common power source if the fault condition on the second current source is a first type; and
   disabling the second current source and continuing to provide current to the first string of LEDs if the fault condition on the second current source is a second type.

6. The method of claim 1 further comprising regulating the power source in response to the lowest of a group including the voltages of at least the first and second current sources.

7. The method of claim 6 further comprising excluding the voltage of the first current source from the group if the fault condition is the second type.

8. A method comprising:
   driving an LED with a current source during a normal operation;
   monitoring the current source during normal operation;
   disabling the current source and applying a test current to the current source in response to a fault condition on the current source during normal operation; and
   determining the type of fault condition in response to the test current during normal operation.

9. The method of claim 8 where monitoring the current source comprises monitoring the voltage across the current source.

10. The method of claim 9 where a fault condition is indicated by the voltage across the current source dropping below a threshold.

11. The method of claim 8 where determining the type of fault condition comprises monitoring the voltage across the current source.

12. The method of claim 11 where current is applied to the LED with a power source.

13. The method of claim 12 further comprising disabling the power source if the fault condition is a short circuit fault.

14. The method of claim 11 where determining the type of fault condition comprises monitoring the voltage across the current source for a predetermined period of time.

15. A circuit comprising:
   a connection to control a common power source to provide current to two or more strings of LEDs;
   two or more current sources, each current source arranged to regulate the current through one of the strings of LEDs;
   two or more test current sources, each test current source arranged to provide a test current to a corresponding one of the current sources; and
   logic to:
      monitor the voltages across the current sources,
      disable a first one of the current sources if the voltage across the first one of the current sources exceeds a first threshold,
      enable the test current source corresponding to the first one of the current sources, and
      disable the common power source if the voltage across the first one of the current sources fails to exceed a second threshold while the test current source is enabled.

16. The circuit of claim 15 where the logic is to disable the first one of the current sources and enable the common power source if the voltage across the first one of the current sources exceeds the second threshold while the test current source is enabled.

17. The circuit of claim 16 further comprising logic to report whether the voltage across the first one of the current sources failed to exceed a second threshold while the test current source was enabled.

18. The circuit of claim 16 further comprising a feedback loop to regulate the common power source in response to the lowest of the voltages across the current sources.

19. The circuit of claim 18 where the feedback loop includes a selector to select the lowest of the voltages across the current sources.

20. The circuit of claim 19 where the selector excludes the voltage of the first one of the current sources.

* * * * *